(12) United States Patent
Arthur et al.

(10) Patent No.: US 8,199,305 B2
(45) Date of Patent: Jun. 12, 2012

(54) PIXEL WELL ELECTRODES

(75) Inventors: Alan R. Arthur, Salem, OR (US); Ronald A. Hellekson, Eugene, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 12/651,711

(22) Filed: Jan. 4, 2010

(65) Prior Publication Data

US 2010/0177272 A1 Jul. 15, 2010

Related U.S. Application Data

(62) Division of application No. 11/830,997, filed on Jul. 31, 2007, now Pat. No. 7,656,493.

(51) Int. Cl.
*G02F 1/1343* (2006.01)

(52) U.S. Cl. ............. 349/143; 349/147; 257/88; 257/91

(58) Field of Classification Search ................. 349/143, 349/147; 257/88, 91
See application file for complete search history.

(56) References Cited

U.S. PATENT DOCUMENTS

| | | | |
|---|---|---|---|
| 3,954,534 A | 5/1976 | Scifres et al. | |
| 4,933,302 A | 6/1990 | Costrini et al. | |
| 6,640,021 B2 | 10/2003 | Pogge et al. | |
| 6,906,121 B2 | 6/2005 | Stieber et al. | |
| 7,026,181 B2 | 4/2006 | Guo et al. | |
| 7,049,161 B2 | 5/2006 | Park et al. | |
| 7,054,052 B2 | 5/2006 | Niklaus et al. | |
| 7,172,911 B2 | 2/2007 | Kalvesten et al. | |
| 7,189,589 B2 | 3/2007 | Carey et al. | |
| 2002/0100691 A1 | 8/2002 | Bonivert | |
| 2002/0158994 A1* | 10/2002 | Hashimoto et al. | 349/43 |
| 2002/0182544 A1 | 12/2002 | Chan-Park et al. | |
| 2002/0188053 A1 | 12/2002 | Zang et al. | |
| 2004/0226824 A1 | 11/2004 | Murata | |
| 2005/0140620 A1* | 6/2005 | Aoyama et al. | 345/87 |
| 2005/0140889 A1* | 6/2005 | Chae et al. | 349/139 |
| 2006/0146391 A1 | 7/2006 | Lee et al. | |
| 2006/0256249 A1* | 11/2006 | Nagano et al. | 349/43 |
| 2006/0283539 A1 | 12/2006 | Slafer | |
| 2008/0024902 A1 | 1/2008 | Slafer | |

* cited by examiner

*Primary Examiner* — Kiesha Bryant
*Assistant Examiner* — Jamie C Niesz

(57) ABSTRACT

A pixel well includes first and second electrodes below a floor.

23 Claims, 20 Drawing Sheets

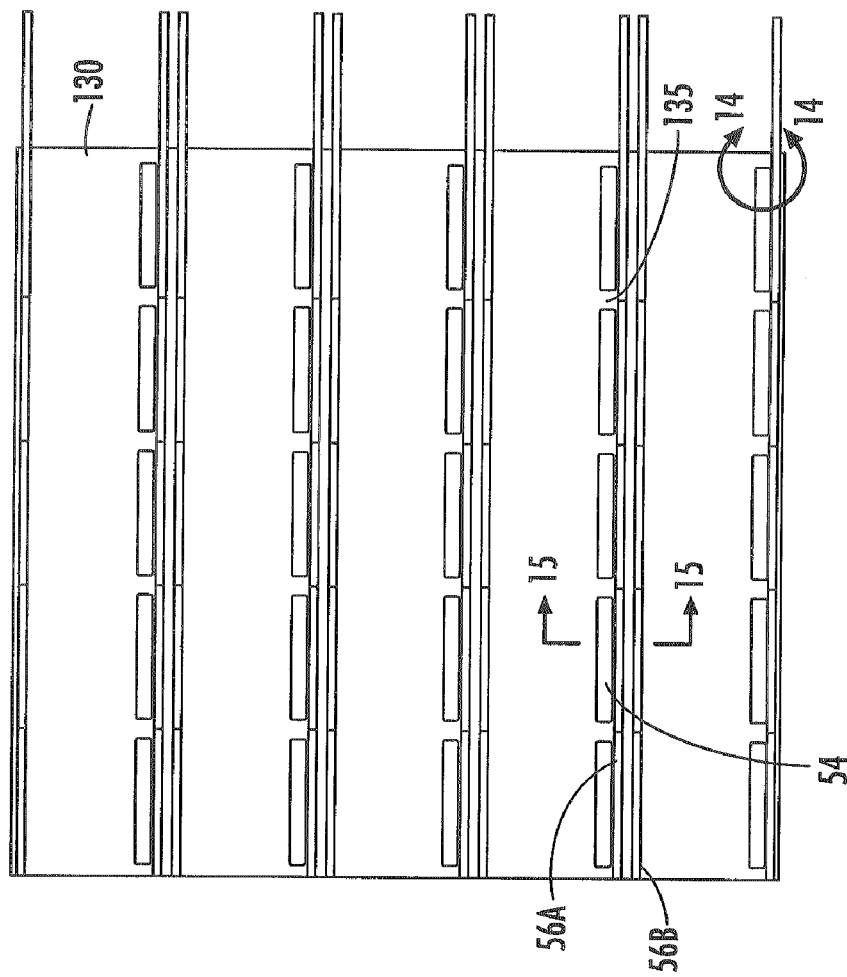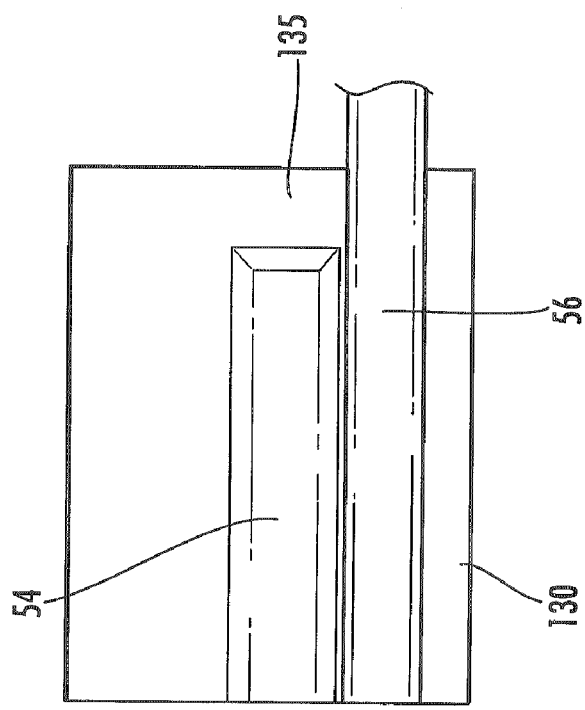

PIXEL WELL ELECTRODES

CROSS-REFERENCE TO RELATED PATENT APPLICATIONS

The present application is a divisional application filed under 37 C.F.R. 1.53(b) and claims priority from U.S. application Ser. No. 11/830,997 filed on Jul. 31, 2007 now U.S. Pat. No. 7,656,493 and entitled PIXEL WELL ELECTRODES by Alan R. Arthur and Ronald A. Hellekson, the full disclosure of which is hereby incorporated by reference The present application is related to co-pending U.S. patent application Ser. No. 11/831,586 filed on Jul. 31, 2007 by Alan R. Arthur and Ronald A. Hellekson and entitled PIXEL WELL AND ELECTRODES, the full disclosure of which is hereby incorporated by reference.

BACKGROUND

Displays and other devices may include pixels having wells containing electro-optical material. States of the electro-optical material are controlled by electrodes applying an electric field or charge to the material. Achieving satisfactory alignment of pixel wells and their electrodes may be difficult, may be expensive and may result in harmful residual stresses.

BRIEF DESCRIPTION OF THE DRAWINGS

FIG. 13 as a top plan view of the mandrel of FIG. 11 with second electrodes formed on the exposed second levels according to an example embodiment.

FIG. 14 is an enlarged view of the mandrel of FIG. 13 taken along line 14-14 according to an example embodiment.

DETAILED DESCRIPTION OF THE EXAMPLE EMBODIMENTS

Figure 1:
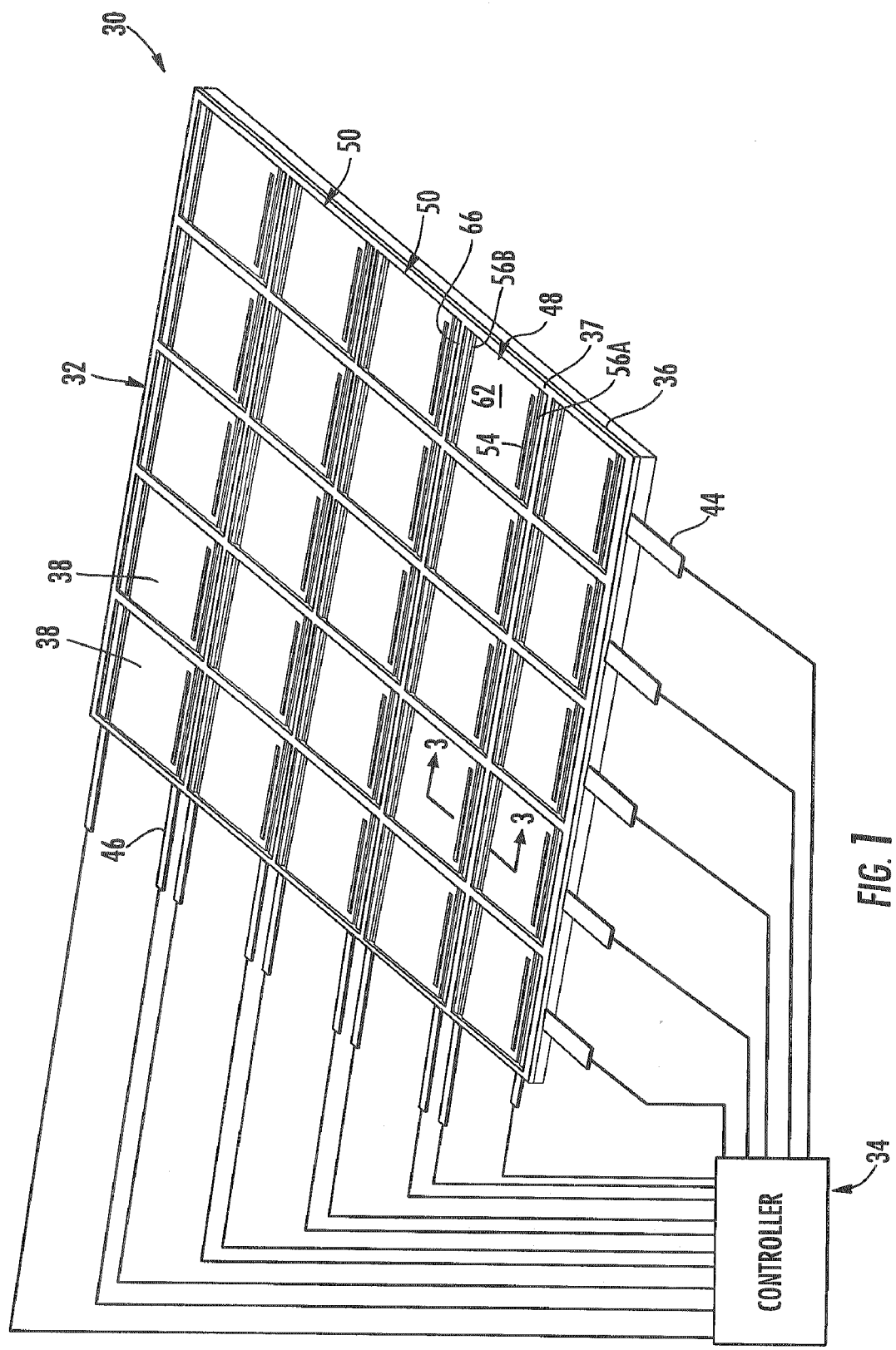
FIG. 1 is a top perspective view of a display with portions schematically shown according to an example embodiment.
Figure 2:
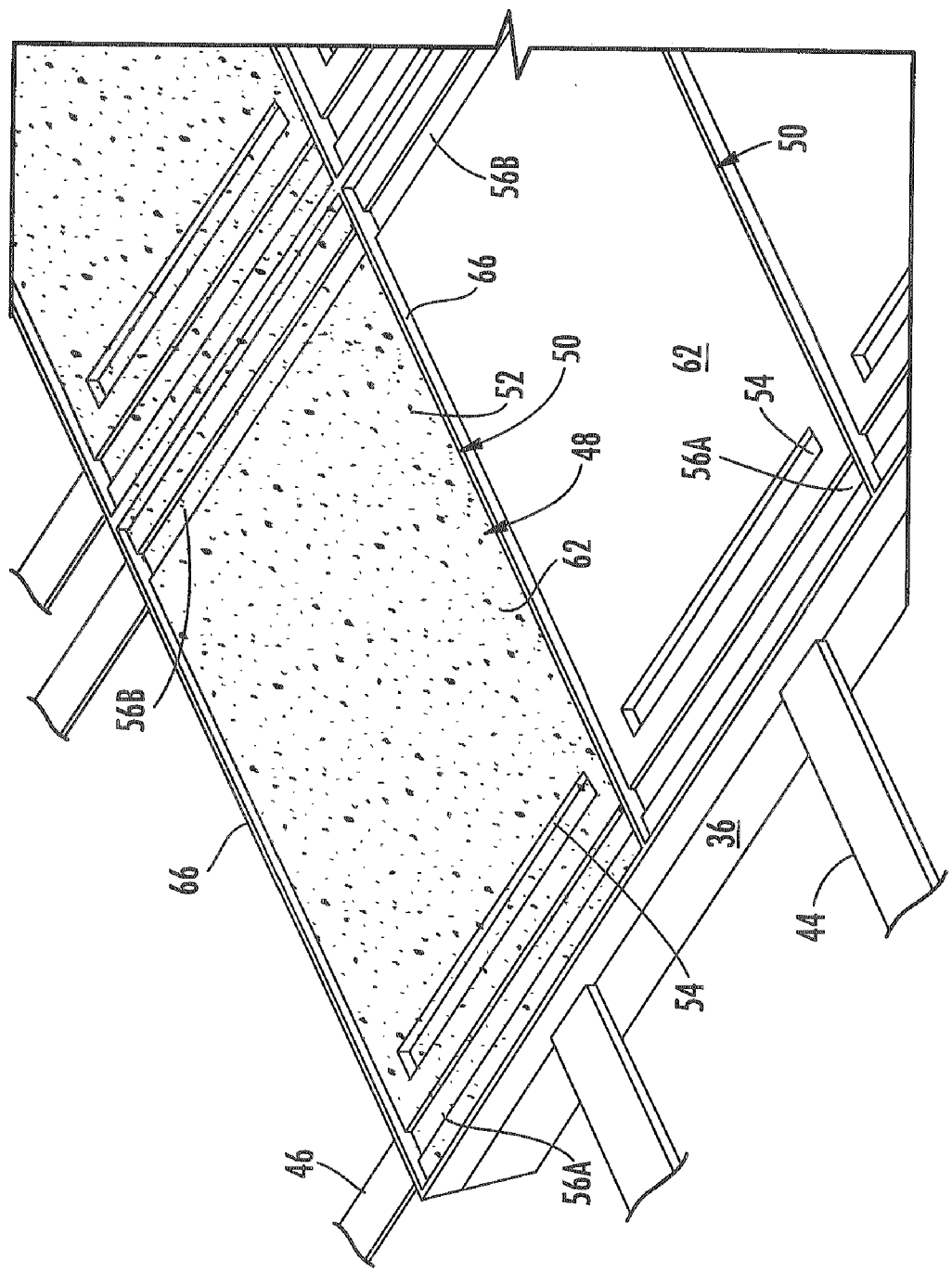
FIG. 2 is an enlarged perspective view of a display panel of the display of FIG. 1 according to an example embodiment.
Figure 3:
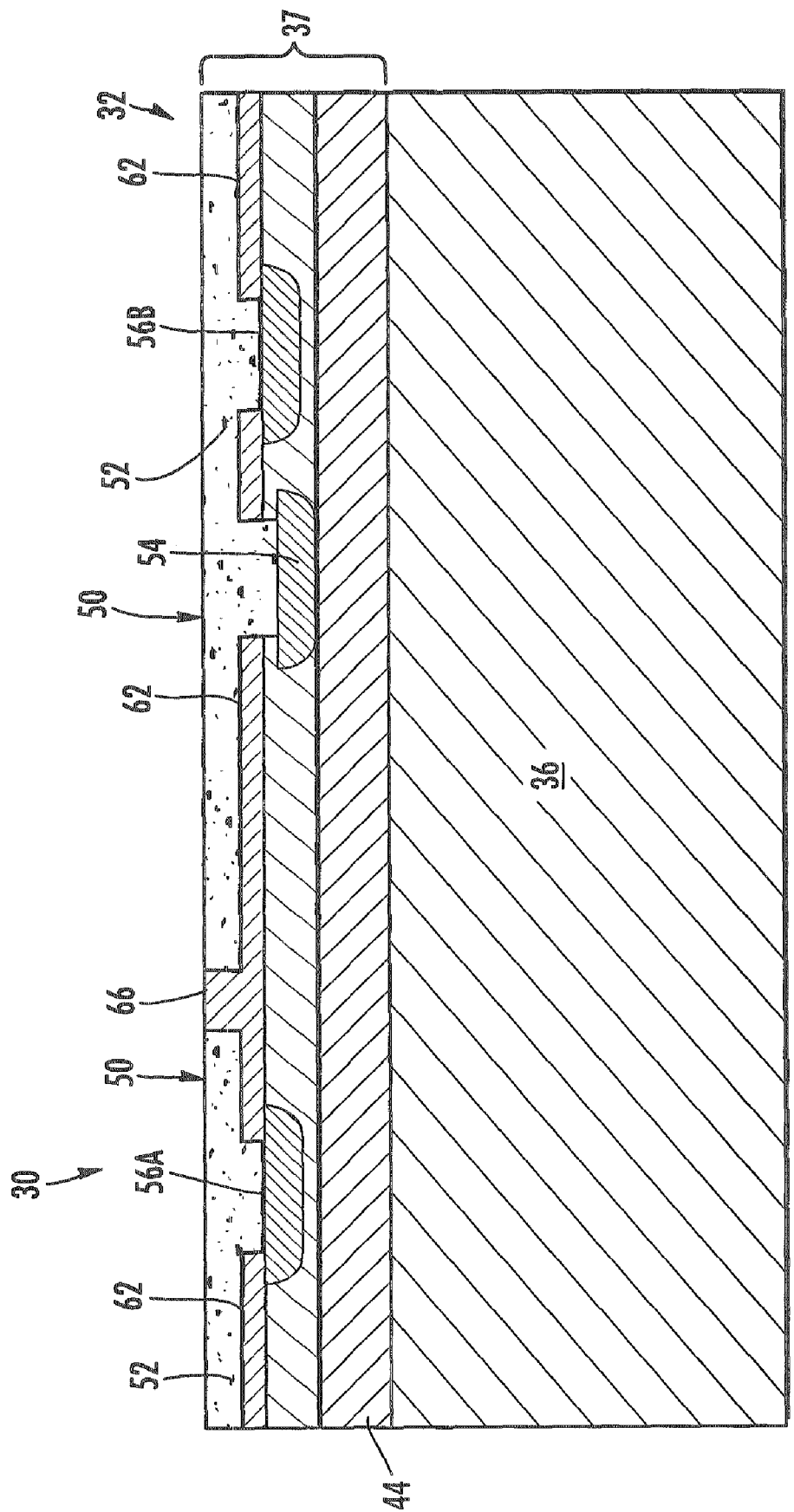
FIG. 3 is a sectional view of the display panel of FIG. 2 taken along lines 3-3 according to an example embodiment.

FIGS. 1-3 illustrate display 30 according to an example embodiment. Display 30 is configured to provide an image and includes display panel 32 and controller 34. As will be described hereafter, display panel 32 has enhanced alignment and relatively low residual stresses due to fewer material interfaces. In addition, display panel 32 may be fabricated with fewer processing steps, reducing fabrication cost.

Display panel 32 comprises a panel including substrate 36 and a pixel layer 37 including an array or matrix of individually and independently actuatable pixels 38 and a grid of circuit or conductor lines 44, 46. Substrate 36 comprises one or more layers of one or more materials configured to serve as a base, platform or foundation for supporting pixel layer 37. In one embodiment, substrate 36 comprises one or more layers of one or more polymers or plastics. As a result, substrate 36 has enhanced flexibility, durability, and cost for large area and unusual form factors. Although polymers or plastics may have a greater susceptibility to dimensional instabilities due to temperatures during fabrication, display panel 32 is configured to be fabricated using methods or processes, such as the example method described hereafter in FIGS. 4-21, that reduce the otherwise resulting alignment issues and residual stresses. In other embodiments, substrate 36 may comprise other materials.

Pixel layer 37 comprises a layer of multiple pixels 38 and underlying conductor lines 44, 46. As shown in more detail in FIGS. 2 and 3, each pixel 38 includes a pixel well 48, electro-optical material 52, electrodes 54 and electrodes 56A, and 56B. (collectively referred to as electrodes 56). Pixel wells 48 comprise basins or depressions configured to receive and retain electro-optical material 52. Pixel wells 48 further define individual pixels 38. Each pixel well 48 includes a floor 62 and side walls 66. Sidewalls 66 rise up from floor 62 to form the basin for containing electro-optical material 52. In one embodiment, floor 62 and sidewall 66 are integrally formed as part of a single unitary body. In one embodiment, floor 62 and sidewall 66 are formed from a single layer of material. As a result, fabrication of floor 62 and sidewalls 66 may be concurrently performed, reducing processing steps and cost.

Electro-optical material 52, illustrated in a portion of pixels 38 shown in FIG. 2, comprises one or more charge responsive optical materials configured to change between different optical states in response to an applied electrical field or electrical charge applied by electrodes 54, 56. In one embodiment, electro-optical material 52 may be configured to change between a transparent or translucent state and an opaque state in response to an applied electrical field or electrical charge. As noted above, the opaque state may comprise a colored state such as cyan, magenta, yellow, red, green, blue or other colors. The opaque state may also comprise a darkened gray or black state. Examples of electro-optical material include, but are not limited to, dyed or undyed polymer dispersed liquid crystal, dispersions or solutions of charged particles or pigments or possibly electro chromatic materials.

Electrodes 54, 56 comprise pads, terminals or other structures of one or more electrically conductive materials extending within each pixel well 48 and electrically connected to the grid of conductor lines 44, 46. Electrodes 54 are connected to conductor lines 44 while electrodes 56 are connected to conductor lines 46. Electrodes 54, 56 are configured to have a different charge or to be placed at distinct electrical potentials so as to apply an electrical field or charge to the electro-optical material 52 within their associated pixel well 48.

As further shown by FIGS. 2 and 3, electrodes 54 and 56 are formed at or below floor 62. In the particular example illustrated electrodes 54, 56 are recessed from or extend below a top surface of floor 62. In the example illustrated, the subterranean electrodes 54, 56 are exposed along 62. In the example illustrated, the subterranean electrodes 54, 56 are located at distinct depths below floor 62. Because electrodes 54, 56 are formed at or below a top surface of floor 62, electrodes 54, 56 may be more easily fabricated and subject display panel 32 to less residual stresses and alignment issues. As will be described hereafter, this architecture of forming electrodes 54, 56 at or below floor 62 further facilitates fabrication of display panel 32 with fewer process steps and with enhanced alignment of electrodes 54, 56 with respect to pixel wells 48. Because electrodes 54, 56 are at distinct depths, electrical connection of electrodes 54, 56 to conductor lines 44, 46 is less complex.

According to one embodiment, electrodes 54 are at a depth below floor 62 of between about 4 microns and about 6 microns and nominally about 5 microns. The electrodes 56 are at a depth below floor 62 between about 2 microns and about 3.5 microns, and nominally about 3 microns. The lower level for electrode 56 effectively establishes the thickest pixel floor to expect without breaking through to the mandrel during etch. Overall, the depth of the electrodes may increased or decreased depending on if the depth is used as a particle pocket for electrophoretic or if it needs to be overcoated to be level with the pixel well floor 62.

In the particular example illustrated, each pixel 50 is illustrated as including two electrodes 56A and 56B. As a result, distinct electrical fields or charges may be applied to electro-optical material 52 within well 48 using different conductor lines 46 and different electrodes 56. For example, one of electrodes 56 may be configured to cooperate with electrode 54 to apply first voltage or electrical potential to electro-optical material 52 while another of electrodes 56 may be configured to cooperate with electrode 54 to apply a second distinct voltage or electrical potential to electro-optical material 52. In one embodiment, one of electrodes 56 may be configured to cooperate with electrode 54 to apply a voltage at a first frequency to electro-optical material 52 while another of electrodes 56 is configured to cooperate with electrode 54 to apply the same voltage or different voltage with a different frequency to electro-optical material 52. Although electrodes 54, 56 are illustrated as elongate rectangular bars extending parallel to one another, in other embodiments, one or more of electrodes 54, 56 may have other configurations. For example, electrodes 54, 56 may include fingers or extensions that extend perpendicular or in other directions from the bars or legs shown across their respective wells 48.

In particular embodiments, electro-optical material 52 may be configured to exhibit different characteristics or to actuate between different states in response to different voltages or charges or in response to different frequencies. For example, in one embodiment, electro-optical material 52 may be configured to exhibit different degrees of opaqueness or translucency in response to different charges or applied electrical fields.

In another embodiment, such as when electro-optical material 52 includes phosphors, electro-optical material 52 may emit light in response to a first range of frequencies and may not emit light or may emit light to a different extent in response to a second range of frequencies.

Although pixels 50 are illustrated as having two electrodes 56, in other embodiments, pixels 50 may have fewer or greater of such electrodes 56. In one embodiment, pixels 50 may alternatively include a single electrode 56. Although electrodes 56 are illustrated as being at substantially the same level or depth with respect to floor 62, in other embodiments, electrodes 56 may it be at distinct depths. In still other embodiments, electrodes 54 and 56 may be at a common depth or may not be exposed along the surface of floor 62.

As shown by FIG. 1, conductor lines 44, 46 electrically connect electrodes 54, 56 of pixels 50 to controller 34. In particular, conductor lines 44 electrically connect controller 34 to electrodes 54. Conductor lines 46 electrically connect controller 34 to electrodes 56. Electrical charge (control signals) are transmitted by conductor lines 44 and 46 to selectively actuate the electro-optical material 52 (shown in FIG. 2) within pixel wells 48 to selected states to present an image.

Controller 34 comprises one or more processing units configured to generate electrical control signals for selectively actuating electro-optical material 52 of individual pixels 38 in pixel layer 37. As schematically represented in FIG. 1, controller 34 is electrically connected to pixels 38 by conductor lines 44, 46. The electrical signals transmitted to each pixel 38 result in an electrical charge or field being applied to the electro-optical material 52 within each pixel 38 to selectively actuate each pixel 38.

For purposes of this application, the term "processing unit" shall mean a presently developed or future developed processing unit that executes sequences of instructions (such as video or display driver instructions) contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 34 may be embodied as part of one or more application-specific integrated circuits (ASICs). Unless otherwise specifically noted, the controller is not limited to any specific combination of hardware circuitry and software, nor to any particular source for the instructions executed by the processing unit.

Figure 4:
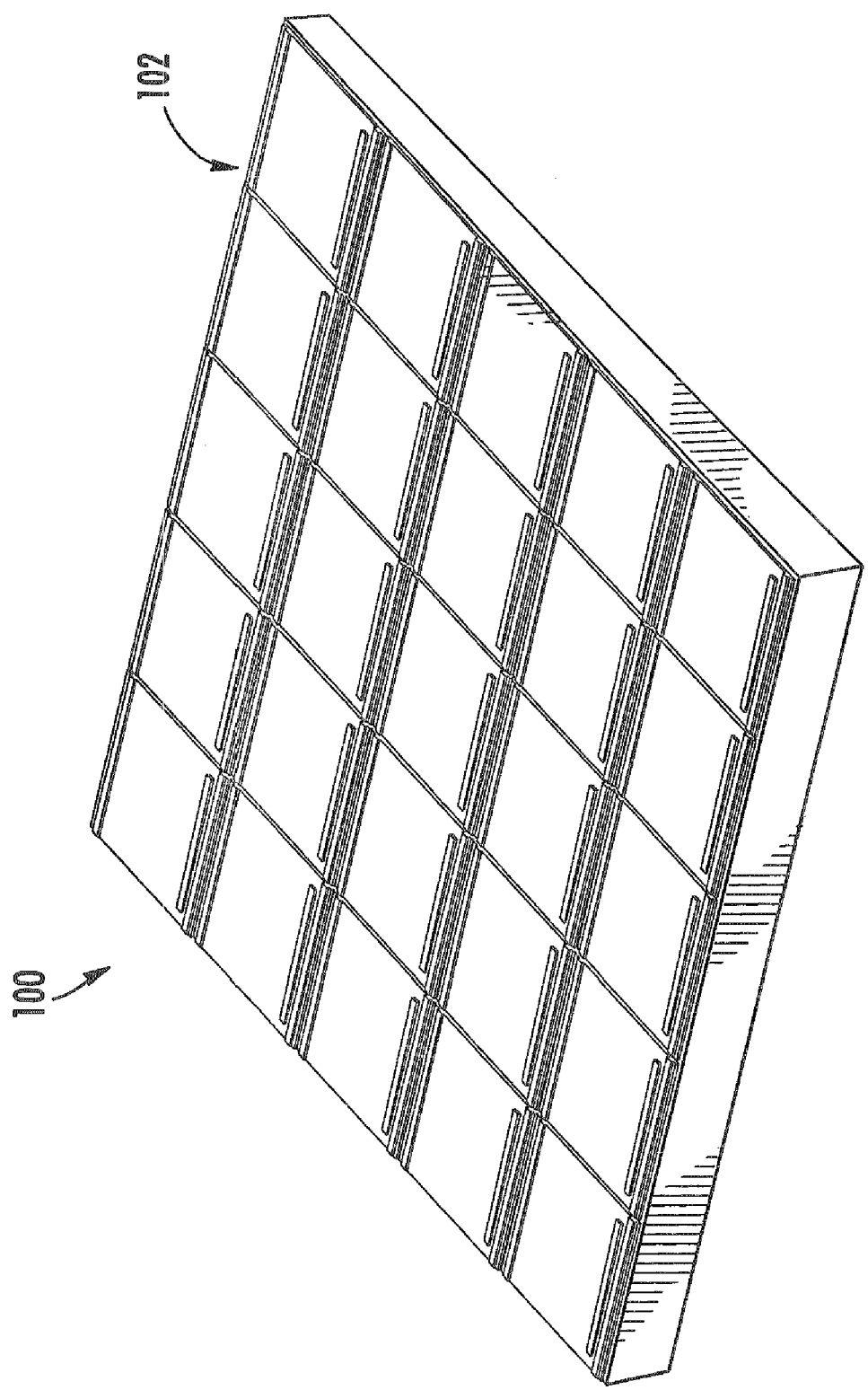
FIG. 4 is a top perspective view of a multilevel mandrel for use in one example method for forming the display panel of FIG. 2 according to an example embodiment.
Figure 5:
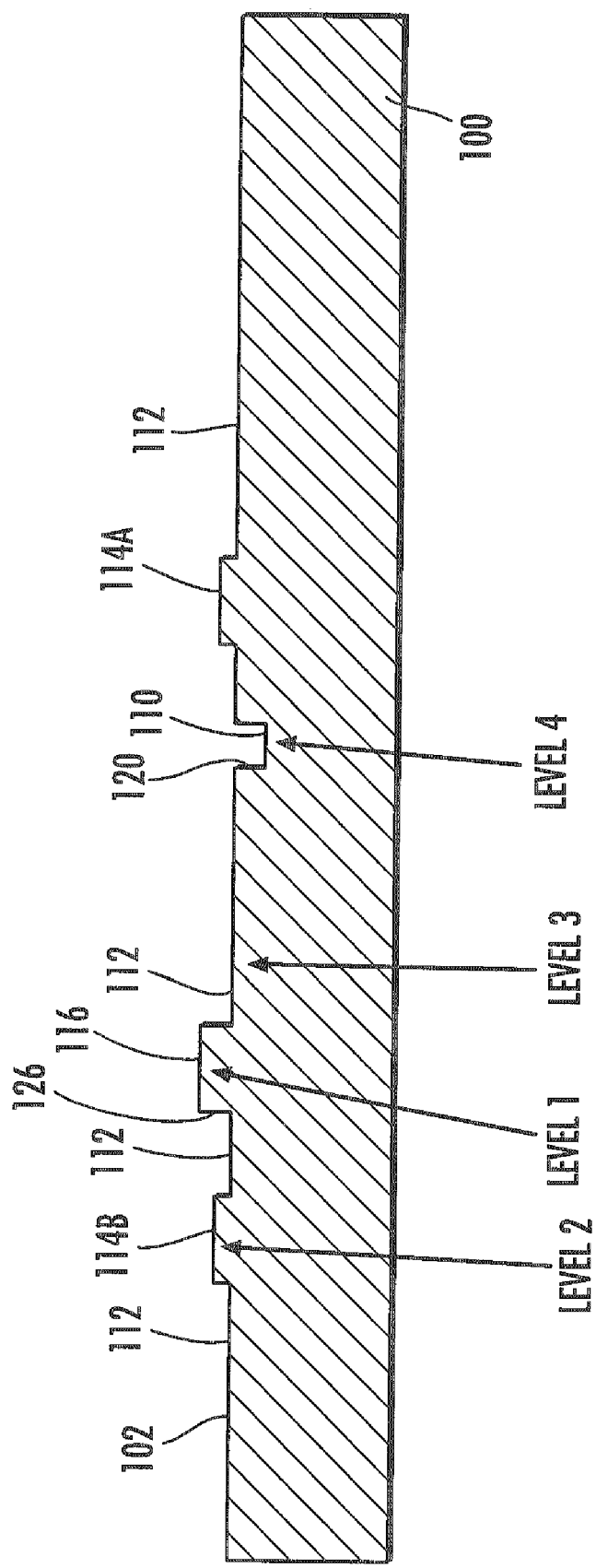
FIG. 5 is a sectional view of the mandrel of FIG. 4 taken along lines 5-5 according to an example embodiment.

FIGS. 4-21 illustrates one example method for forming display panel 32. As shown by FIGS. 4 and 5, a multi-level mandrel 100 is provided. Mandrel 100 serves as a base or foundation upon which a remainder of display panel 32 is formed or fabricated. Mandrel 100 has a face 102 including multiple levels or features corresponding to the location, shape and size of structures of pixels 50 of display panel 32. Such levels serve to locate features of pixels 50 and display panel 32. As shown by FIGS. 4A and 5, face 102 includes levels 110, levels 112, levels 114A and 114B, (collectively referred to as levels 114) and levels 116. Levels 110 extend into mandrel 100 and have a depth greater than levels 112, 114 and 116. Levels 110 comprises a floor of grooves or channels 120 extending in mandrel 100 from levels 112.

Channels 120 extend across the face 102 and form a grid or matrix of channels 120 across face 102. Channels 120 define sidewalls 66 (shown in FIG. 2). In particular, the depths of channels 120 define a height of sidewalls 66 with levels 110 defining a top of sidewalls 66. The widths of channels 120 define a width of sidewalls 66 between consecutive pixels 38. According to one embodiment, channels 120 have a depth of between about 5 microns and about 15 microns, and nominally about 10 microns. Channels 120 have a width of between about 5 microns and about 60 microns, and nominally about 10 microns. In other embodiments, channels 120 may have other dimensions or configurations. Moreover, although levels 110 are illustrated as being generally flat or planar, parallel to face 102, in other embodiments, levels 110 may have other configurations.

Levels 112 extend along face 102 at locations corresponding to floors 62 of pixels 38. Levels 112 extend between levels 110, levels 114 and levels 116. Although levels 112 are illustrated as having the surface pattern as shown in FIG. 4, in other embodiment, levels 112 may have other patterns or layouts on face 102 depending upon the corresponding patterns or layouts of levels 110, 114 and 116 which are dependent upon a desired pattern or layout of sidewalls 66 and electrodes 54, 56.

Levels 114 comprise plateaus or tops of projections 124 projecting above levels 112. Levels 114 define the location of electrodes 56. Levels 114 further define potential outermost widths of electrodes 56. In the example illustrated, projections 124 may be broken, interrupted or spaced, wherein separate and distinct continuous conductor lines 56 are formed by the merging of electroplated conductor across any gaps and are subsequently connected to electrodes 46. In other embodiments, projections 124 extend continuously substantially or completely across mandrel 100 such that the subsequently formed electrodes 56 also completely extend across the display panel 32 to concurrently serve as conductor lines 46.

Projections 124 have a height above levels 112 which defines a depth of electrodes 56 below floor 62 (shown in FIG. 2). According to one embodiment, projections 124 have a height above levels 112 of between about 2 microns and about 3.5 microns, and nominally about 3 microns. Projections 124 have a width of between about 3 microns and about 50 microns, and nominally about 5 microns. In other embodiments, projections 124 may have other dimensions or configurations. Moreover, although levels 114 are illustrated as being generally flat or planar, parallel to face 102, in other embodiments, levels 114 may have other configurations.

According to one embodiment in which electrodes 56 are formed by the electroplating electrically conductive materials upon levels 114, at least the surfaces of levels 114 are formed from one or more electrically conductive materials. In one embodiment, an entirety of projections 114 or an entirety of mandrel 100 is formed from one or more electrically conductive materials. In other embodiments where electrodes 56 are deposited upon levels 114 in other manners, surfaces of levels 114 may not be electrically conductive.

Although face 102 of mandrel 100 is illustrated as including two levels 114 with each level having substantially the same height above levels 112 so as to form two electrodes 56 having a same depth below floor 62 (shown in FIG. 2), in other embodiments, face 102 may include a greater or fewer number of such levels 114 such that each pixel 38 is provided with a fewer or greater of such electrodes 56. Moreover, levels 114 may be at distinct heights above levels 112 where electrodes 56 are also at distinct depths below floor 62.

Levels 116 comprise plateaus or tops of projections 126 projecting above levels 112. Levels 116 define the location of electrodes 54. Levels 116 further define potential outermost widths of electrodes 54. Projections 126 have a height above levels 112 which defines a depth of electrodes 54 below floor 62 (shown in FIG. 2). According to one embodiment, projections 126 have a height of between about 4 microns and about 6 microns, and nominally about 5 microns. Projections 126 have a width of between about 3 microns and about 50 microns, and nominally about 5 microns. In other embodiments, projections 126 may have other dimensions or configurations. Moreover, although levels 110 are illustrated as being generally flat or planar, parallel to face 102, in other embodiments, levels 116 may have other configurations. For example, although drawn with projections having orthogonal walls to mandrel faces, projections 126 may also have non orthogonal walls.

According to one embodiment in which electrodes 54 are formed by the electroplating electrically conductive materials upon levels 116, at least the surfaces of levels 116 are formed from one or more electrically conductive materials. In one embodiment, an entirety of projections 126 or an entirety of mandrel 100 is formed from one or more electrically conductive materials. In other embodiments where electrodes 54 are deposited upon levels 116 in other manners, surfaces of levels 116 may not be electrically conductive. An example may be a catalytically initiated electroless plating process.

Although face 102 of mandrel 100 is illustrated as including levels 110, 112, 114 and 116, in other embodiments, face 102 may include a fewer or greater number of levels. For example, face 102 may include additional projections extending above levels 112 where additional subterranean features, such as additional electrodes, are to be provided. Likewise, face 102 may include additional grooves or channels where additional structures projecting above floor 62 (shown in Interval two), such as one or more standoffs, are to be provided.

In one embodiment, mandrel 100 and its face 102 are integrally formed as part of a single unitary body. In one embodiment, mandrel 100 is integrally formed as part of a single unitary body out of an electrically conductive material such as Nickel. In other embodiments, mandrel 100 may be integrally formed out of other materials. In other embodiments, face 102 or portions of face 102 may be bonded, glued, welded, fastened or otherwise attached to a distinct base or supporting structure to form mandrel 100. In such embodiments, face 102 may be formed from an electrically conductive material while the underlying base is formed from a non-electrically conductive material.

Figure 6:
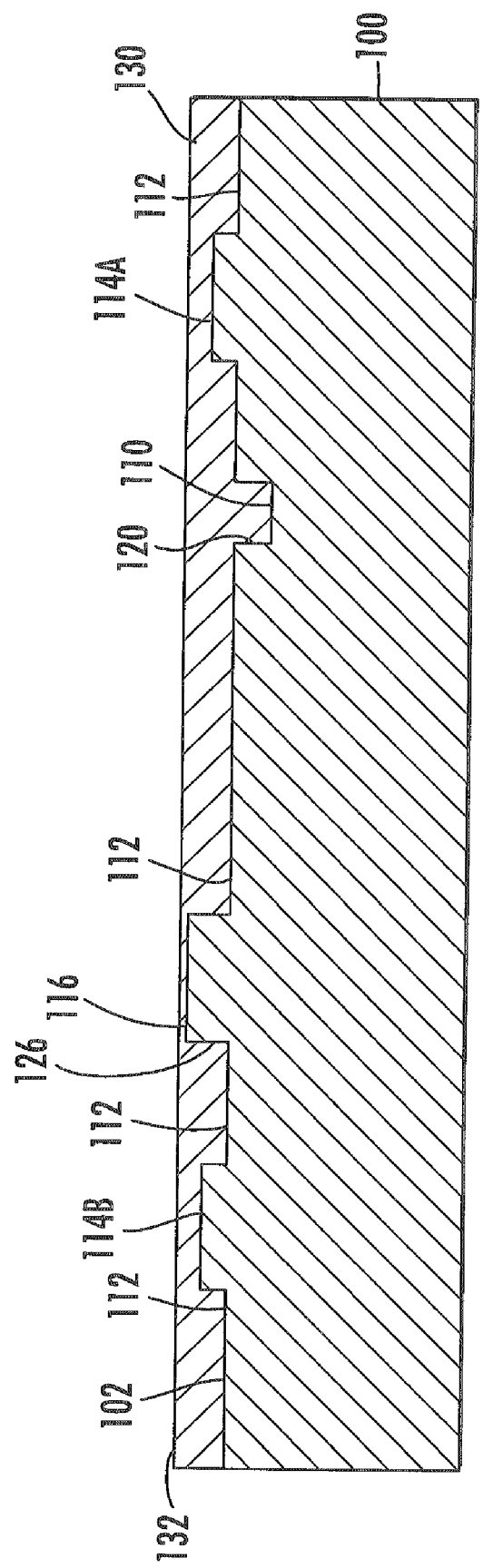
FIG. 6 is a sectional view of the mandrel of FIG. 4 taken along lines 5-5 further covered with a first layer according to an example embodiment.

As shown by FIG. 6, face 102 of mandrel 100 is coated with layer 130 comprising one or more layers of one or more dielectric materials. Such dielectric materials are configured to be selectively removed. In the particular example illustrated, face 102 of mandrel 100 is coated with one or more layers of one more materials which are etchable. According one embodiment, such dielectric materials comprise an etchable resin such as Photoresist "SU-8". In other embodiments, the one or more dielectric materials of layer 130 may comprise other materials.

Layer 130 covers each of levels 110, 112, 114 and 116. As shown by FIG. 6, layer 130 fills in depressions or voids between such levels such that layer 130 has a top surface 132 which is flat and uniform substantially across mandrel 100 and is substantially parallel to the general x-y plane of face 102 of mandrel 100.

Figure 7:
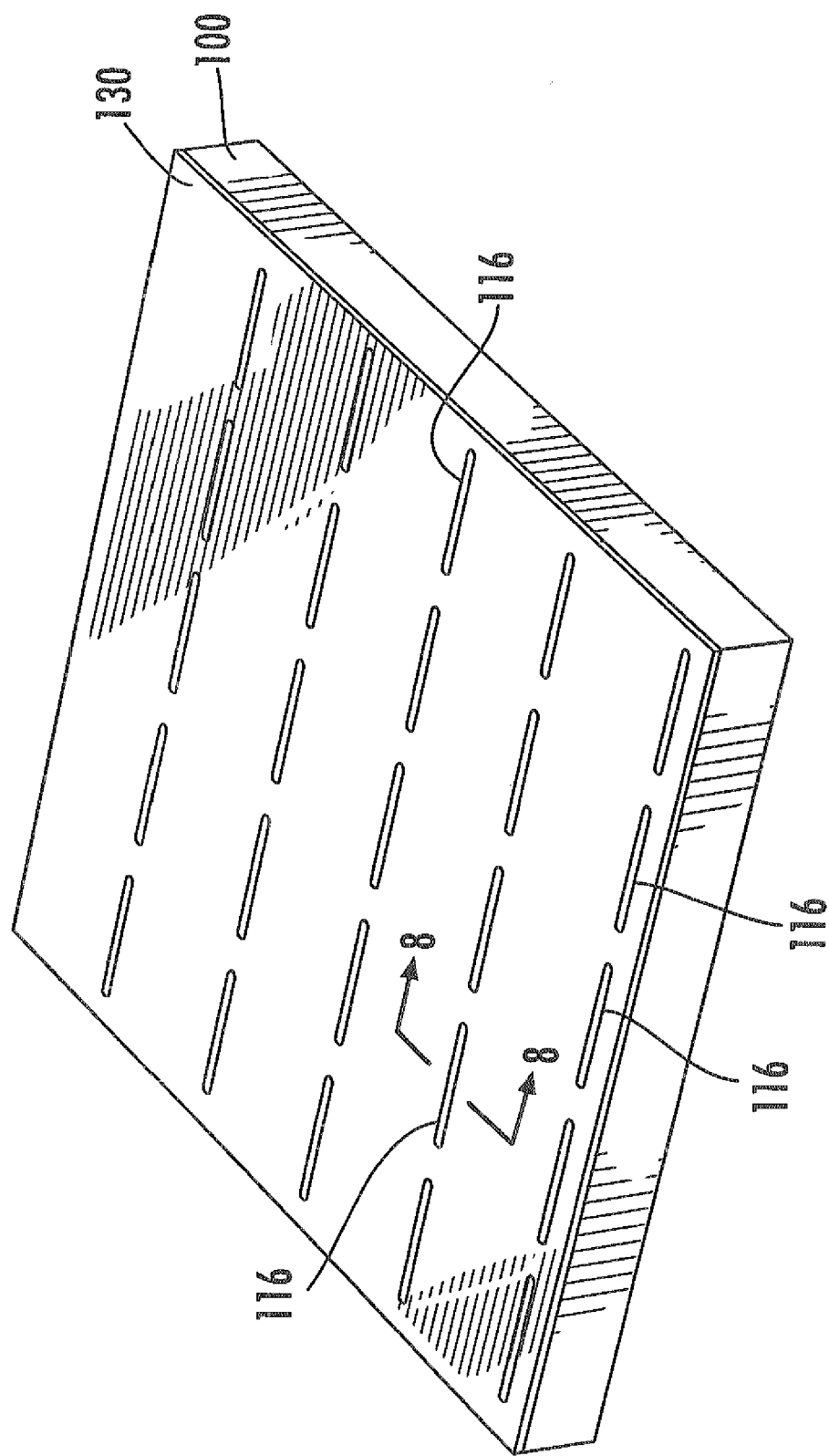
FIG. 7 is a top perspective view of the coated mandrel of FIG. 6 with portions of the first layer removed to expose first levels of the mandrel according to an example embodiment.
Figure 8:
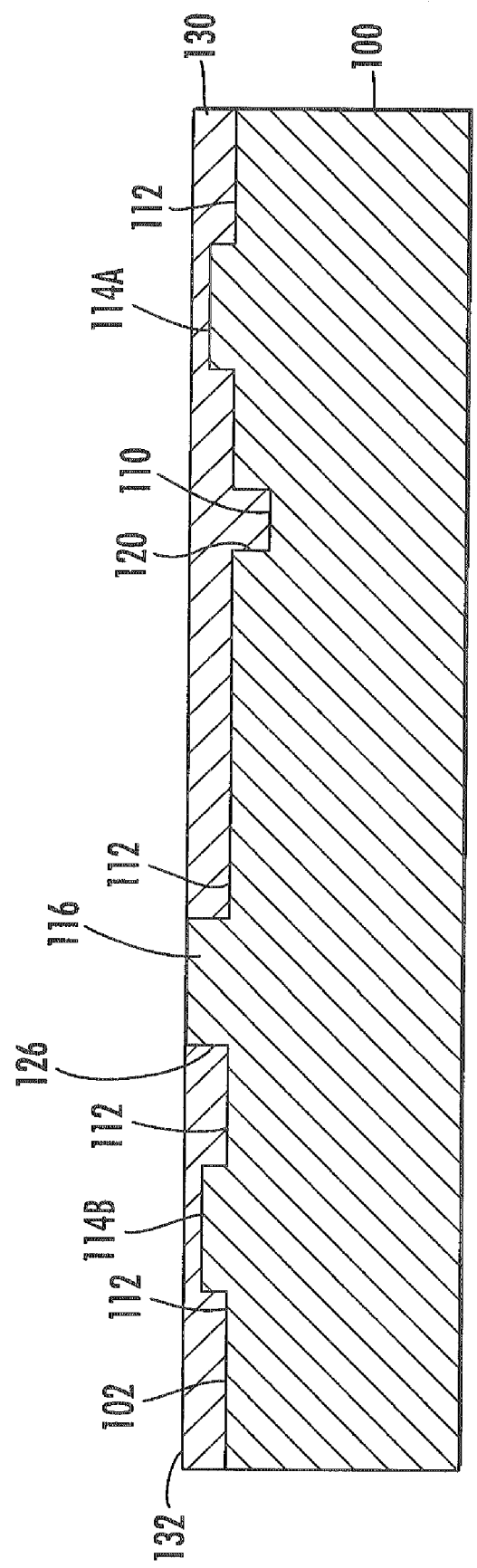
FIG. 8 is a sectional view of the mandrel FIG. 7 taken along lines 8-8 according to an example embodiment.
Figure 9:
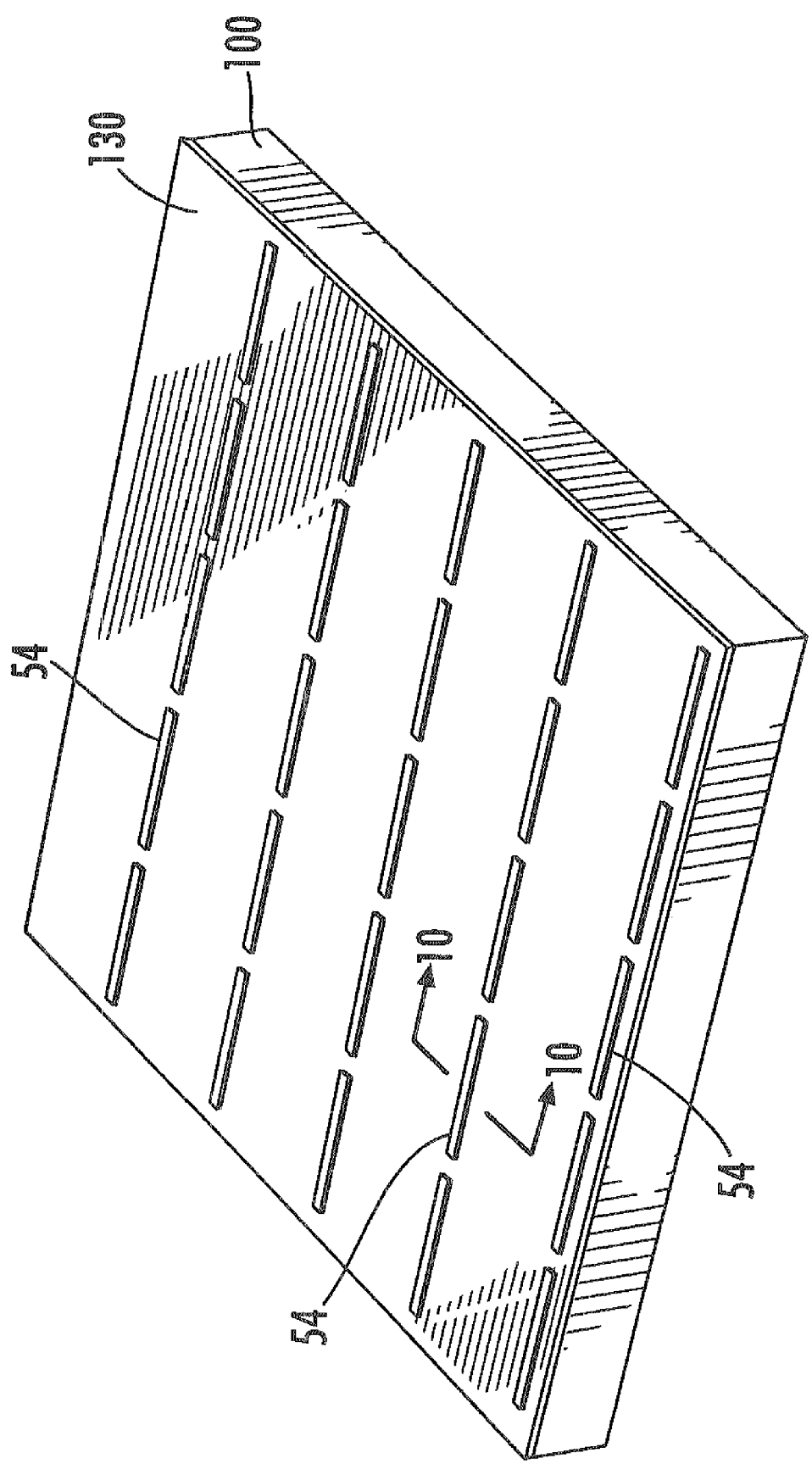
FIG. 9 is a top perspective view of the mandrel of FIG. 7 with first electrodes formed on the exposed first levels according to an example embodiment.
Figure 10:
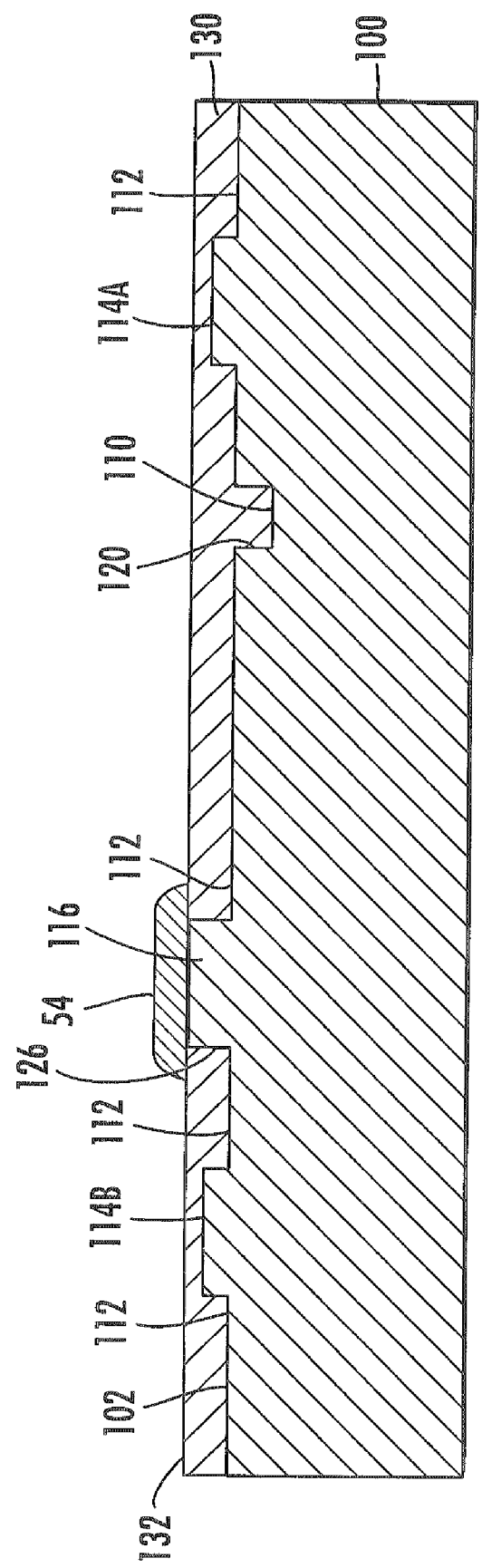
FIG. 10 is a sectional view of the mandrel FIG. 9 taken along line 10-10 according to an example embodiment.

FIGS. 7-10 illustrate formation of electrodes 54 upon mandrel 100. As shown by FIGS. 7 and 8, portions of layer 130 are removed to expose levels 116. In one embodiment, etching is used to remove the selected portions of layer 130 to expose levels 116. In other embodiments, other material removal techniques may be employed.

Because projections 126 project above and beyond projections 124 and because projections 124 and 126 are at distinct heights with respect to mandrel 100, a continuous substantially uniform thickness of layer 130 may be removed so as to expose levels 116 while levels 114 remain covered by layer 130. As a result, photolithography or masking steps may be omitted or reduced in number, reducing fabrication cost and complexity. In yet other embodiments where layer 130, as initially applied, does not cover levels 116, but cover the remaining levels, the removal step of FIGS. 7 and 8 may be omitted.

As shown by 9 and 10, electrodes 54 are formed by depositing electrically conductive material on top of levels 116. In the example illustrated, electrodes 54 are formed by electroplating to form the electrically conductive material on top of the electrically conductive surface of levels 116. As a result, the location of electrodes 54 is controlled and determined by levels 116 of mandrel 100. To some extent, the size and shape of electrodes 54 is also determined by the width and shape of levels 116. Because electrodes 54 are formed by electroplating using levels 116, the number of photolithography steps may be reduced, reducing processing steps and reducing cost. In other embodiments, electrodes 54 may be formed upon levels 116 in other manners.

Figure 11:
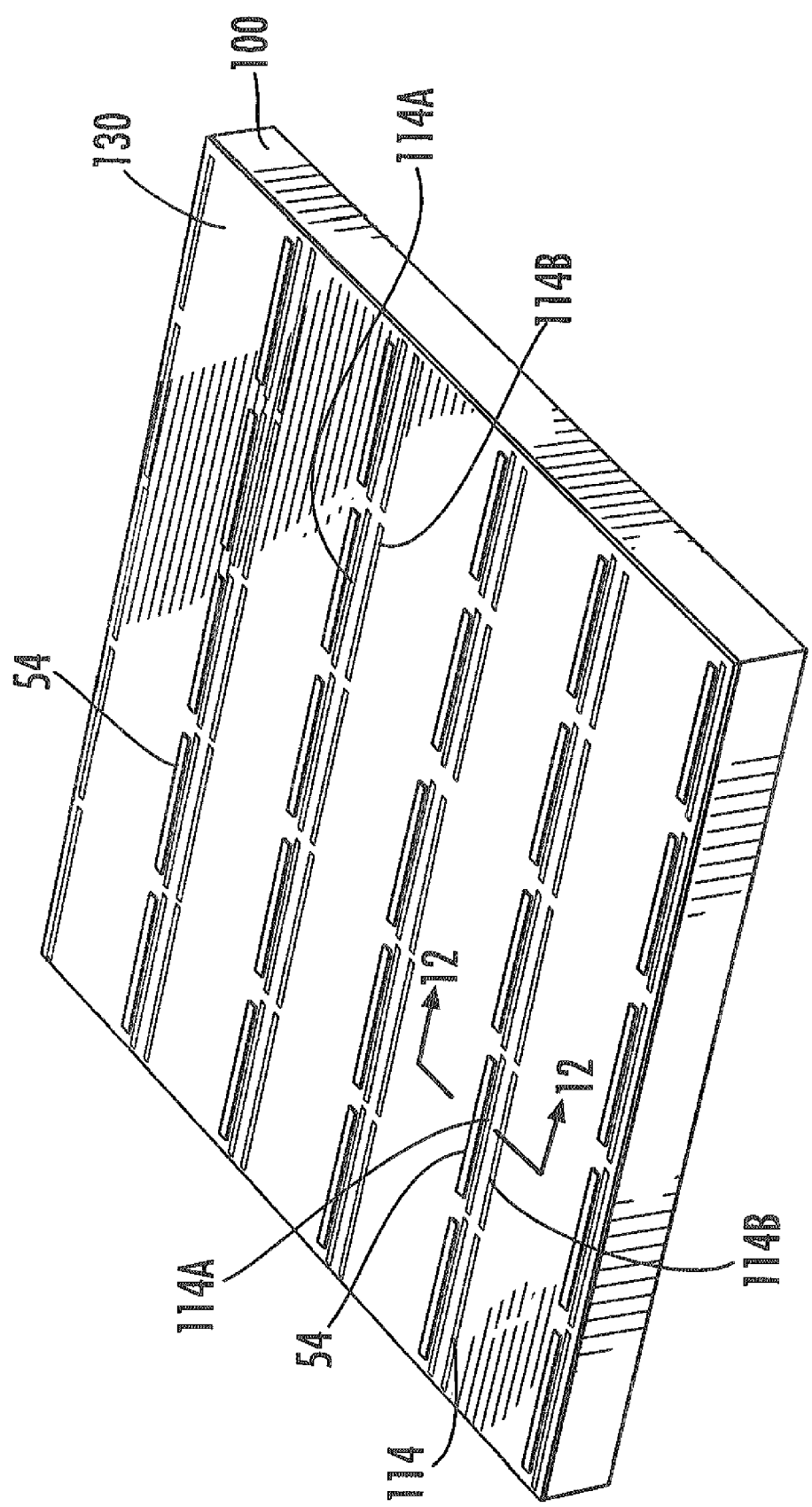
FIG. 11 is a top perspective view of the mandrel of FIG. 9 with portions of the layer removed to expose second levels of the mandrel according to an example embodiment.
Figure 12:
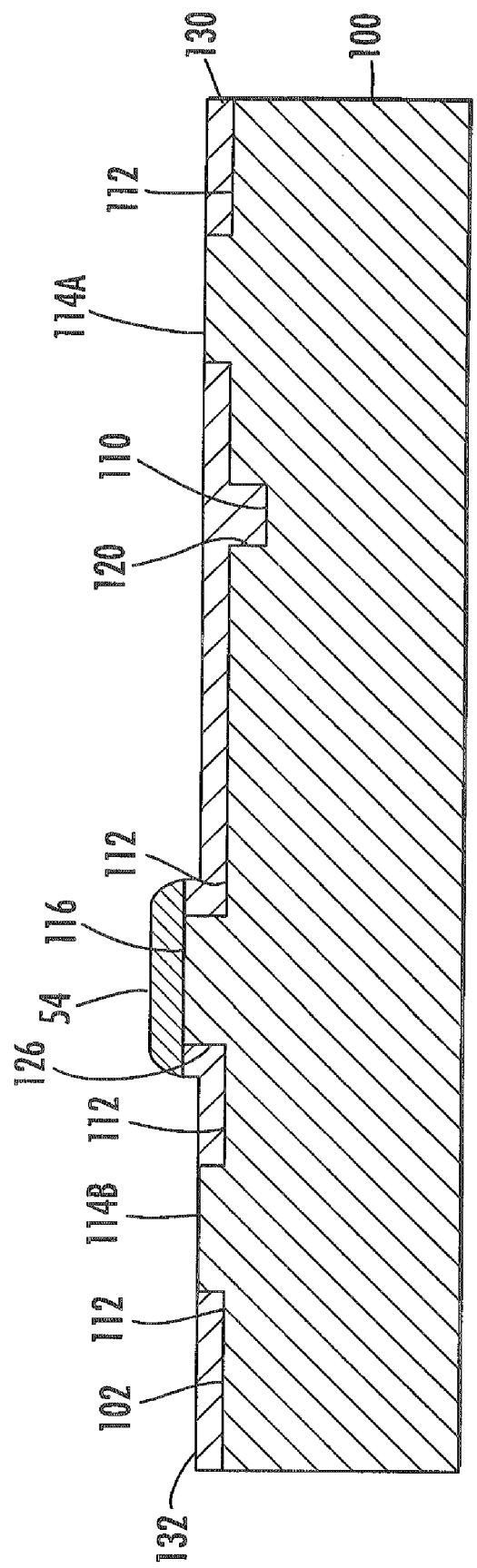
FIG. 12 is a sectional view of the mandrel of FIG. 11 taken along a line 12-12 according to an example embodiment.

FIGS. 11-15 illustrate formation of electrodes 56 upon mandrel 100. As shown by FIGS. 11 and 12, additional portions of layer 130 are selectively removed to expose levels 114. In one embodiment, etching is used to remove the selected portions of layer 130 to expose levels 114. In one embodiment, the etching method is chosen so as to not remove the material of projections 124 or 126. According to one embodiment, projections 124, 126 and face 102 of mandrel 100 are formed from nickel while the etchant used to remove portions of layer 130 comprises a gas such as Oxygen. In other embodiments, other material removal techniques or other removal or etchants may be employed. Because projections 124 project above and beyond levels 112 and because levels 112 and levels 114 are at distinct heights with respect to mandrel 100, a continuous substantially uniform thickness of layer 130 may be removed so as to expose levels 114 while levels 112 remain covered by layer 130. As a result, photolithography or masking steps may be omitted or reduced in number, reducing fabrication cost and complexity.

As shown by 13-15, electrodes 56 are formed by depositing electrically conductive material on top of levels 114. In the example illustrated, electrodes 56 are formed by electroplating electrically conductive material on top of the electrically conductive surface of levels 114. As a result, the location of electrodes 56 is controlled and determined by levels 114 of mandrel 100. To some extent, the size and shape of electrodes 56 is also determined by the width and shape of levels 114. Because electrodes 56 are formed by electroplating using levels 114, the number of photolithography steps may be reduced, reducing processing steps and reducing cost.

Moreover, because electrodes 56 are located using levels 114 which are provided by a single mandrel 100, the relative location electrodes 56 may be precisely and accurately controlled, facilitating alignment of electrodes 56 with respect to one another. Because electrodes 56 are also located using levels 114 which are provided by the same mandrel 100 providing levels 116 that locate electrodes 54 is described above, electrodes 56 are also more accurately and precisely positioned, located and aligned with respect to electrodes 54. Additionally, because electrodes 56 and 54 are located using levels 114 and 116 which are provided by the same mandrel 100 which provides level 110, said electrodes are more accurately and precisely located with respect to pixel well walls 66. In other embodiments, electrodes 56 may be formed upon levels 114 in other manners.

As shown by FIG. 13, electrodes 56 continuously extend across layer 130 to ends of layer 130 and to ends of pixel layer 37 (shown in FIG. 1). As a result, electrodes 56 also serve as part of conductor lines 46 which form a grid of electrical conductor lines for pixel layer 37. In contrast, electrodes 54 are spaced from one another across layer 130 by uncovered areas 135. Uncovered areas 135 generally span across and underlie levels 110 and channels 120 in mandrel 100 such that each electrode 54 within each pixel well 48 (shown in FIG. 2) is electrically isolated from an electrode 54 in an adjacent pixel well 48.

Figure 15:
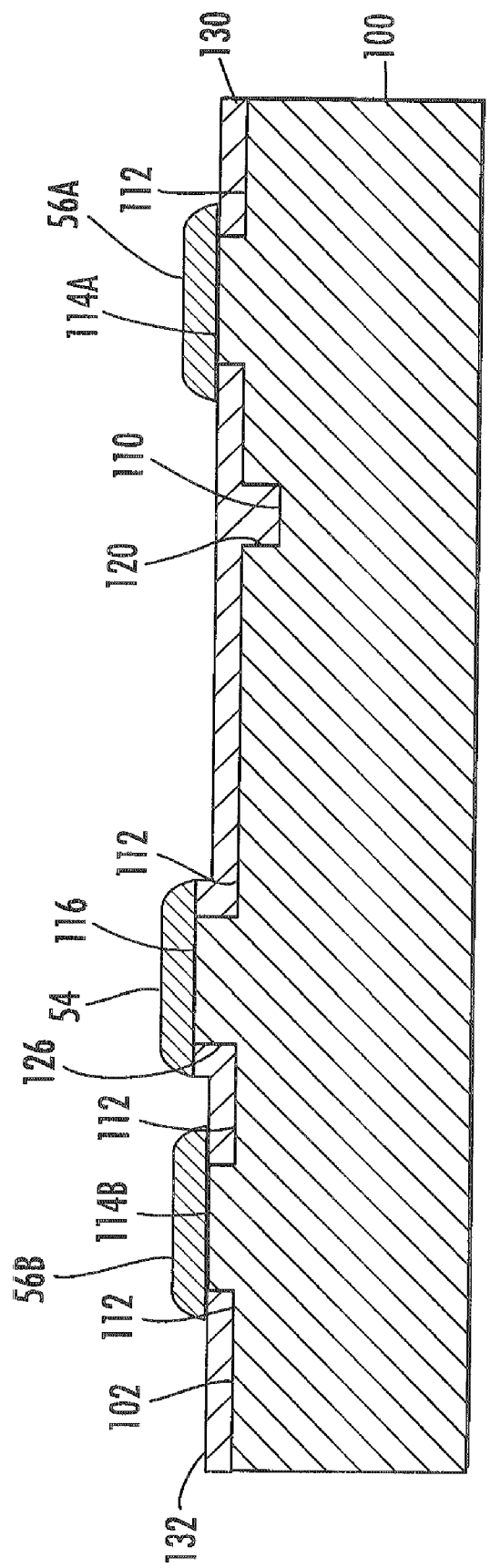
FIG. 15 is a sectional view of the mandrel of FIG. 13 taken along line 15-15 according to an example embodiment.

As further shown by FIGS. 13-15, during electroplating of the electrically conductive material upon levels 114 to form electrodes 56, the electrically conductive material may also be deposited upon the electrodes 54 further building up the electrodes 54 such that electrodes 54 project above and beyond electrodes 56. In other embodiments, the electroplating processes used to form electrodes 54 and 56 may be configured such that electrodes 54 project beyond electrodes 56 even in the absence of being built up during the electroplating of electrodes 56. Because electrodes 54 project beyond electrodes 56, connection of electrodes 54 to conductor lines 44 is facilitated.

Figure 16:
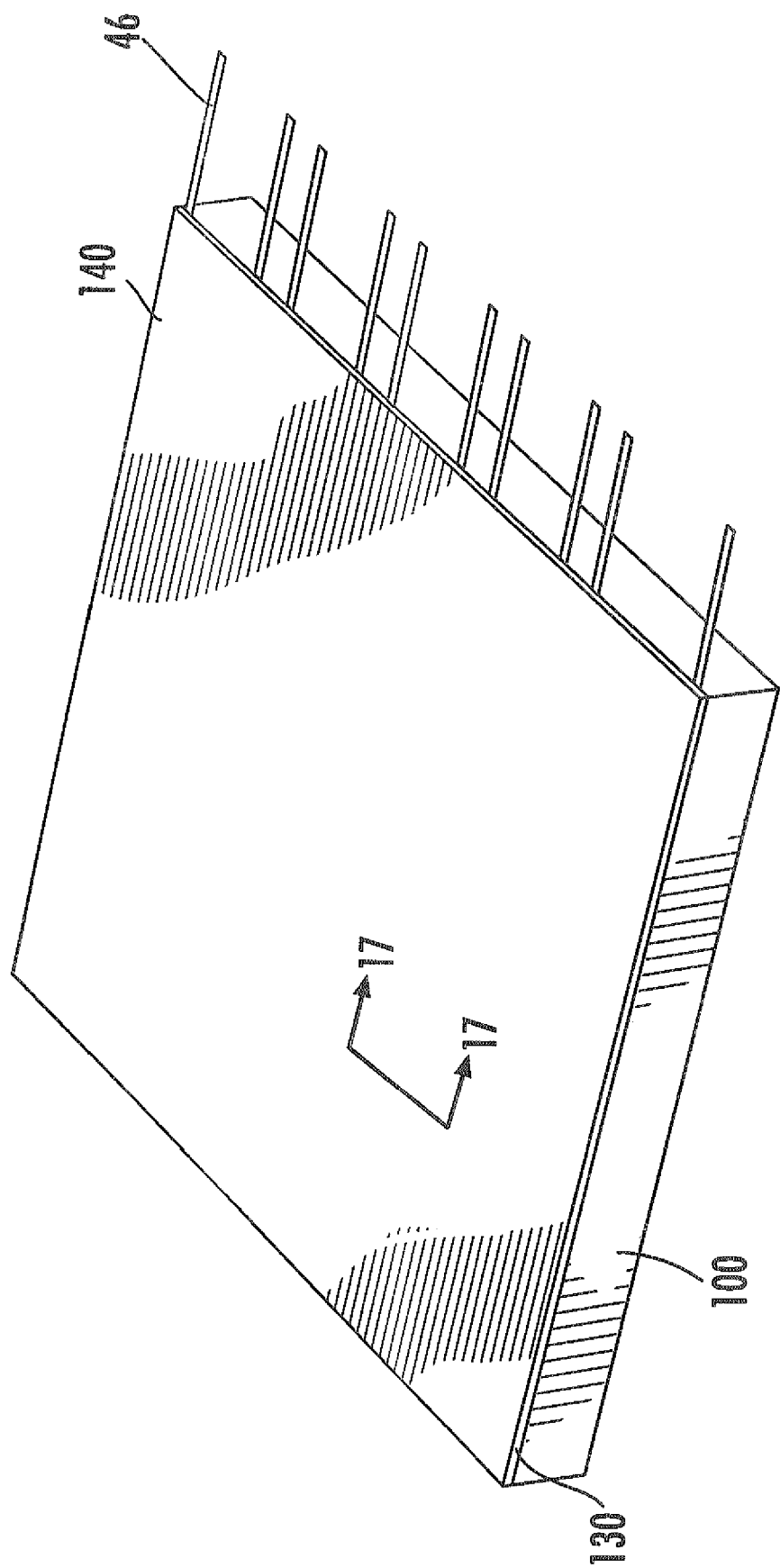
FIG. 16 is a top perspective view of the mandrel of FIG. 13 further coated with a second layer according to an example embodiment.
Figure 17:
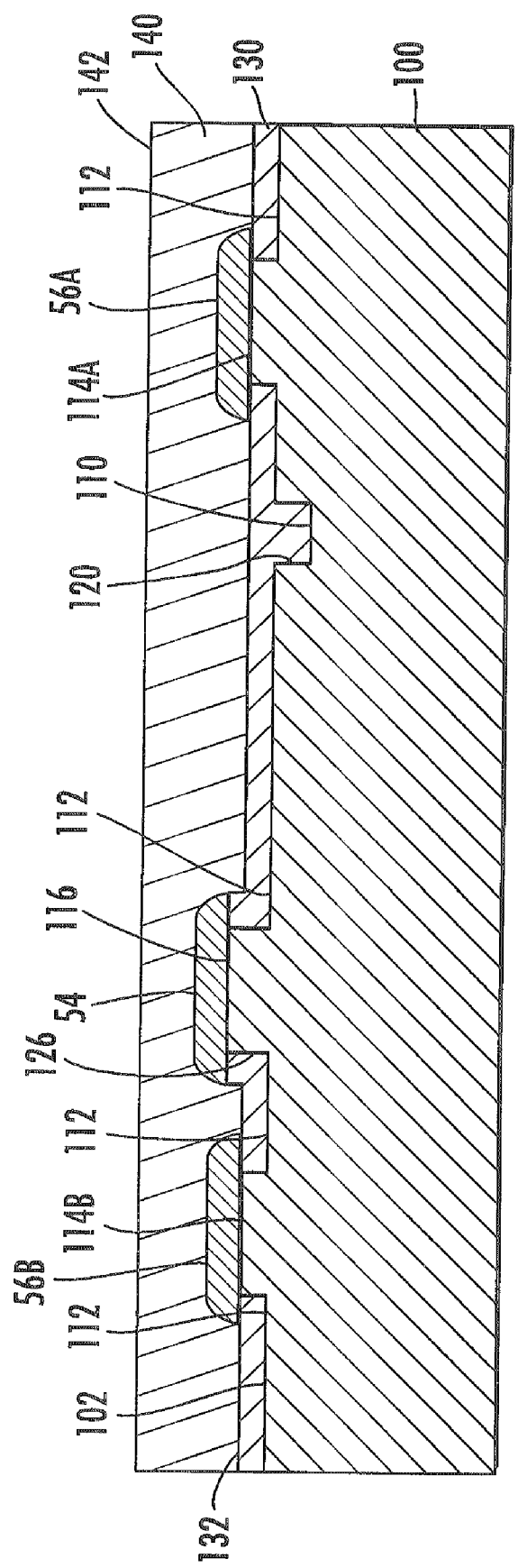
FIG. 17 is a sectional view of the mandrel of FIG. 16 taken along line 17-17 according to an example embodiment.

FIGS. 16-20 illustrate the addition of substrate 36 and the addition of conductor lines 44. FIGS. 16 and 17 illustrate coating or deposition of dielectric layer 140 upon and over layer 130 and electrodes 54, 56. As shown by FIG. 17, layer 140 fills in depressions or voids between such electrodes 54, 56 such that layer 140 has a top surface 142 which is flat and uniform substantially across mandrel 100 and is substantially parallel to the general x-y plane of mandrel 100. Layer 140 assists in electrically separating electrodes 56 from subsequently applied conductor lines 44 (shown in FIG. 1). In other embodiments, layer 140 may alternatively be applied so as to cover just electrodes 56 or just electrodes 56 and layer 130 while the electrodes 54 remain exposed.

Figure 18:
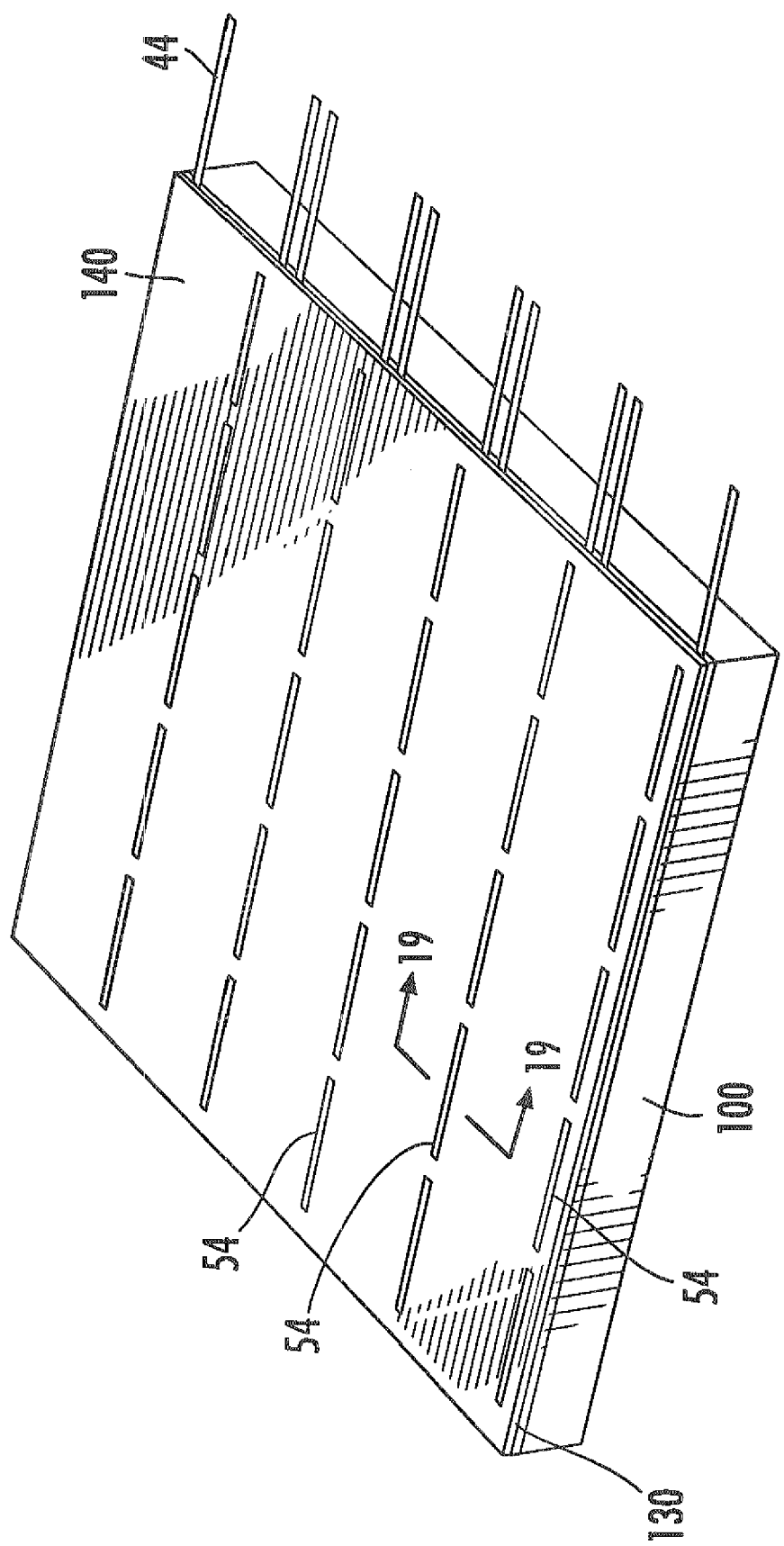
FIG. 18 is a top perspective view of the mandrel of FIG. 16 with portions of the second layer removed to expose the first electrodes according to an example embodiment.
Figure 19:
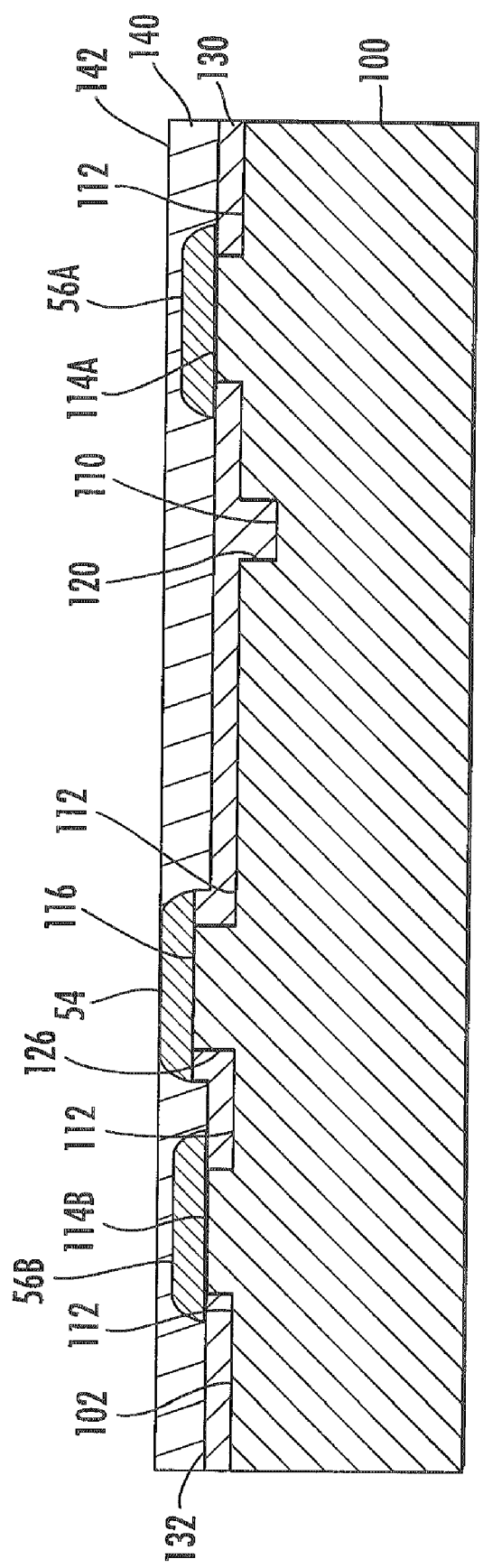
FIG. 19 is a sectional view of the mandrel of FIG. 18 taken along line 19-19 according to an example embodiment.

FIGS. 18 and 19 illustrate the removal of portions of layer 140 to expose electrodes 54. Exposure of electrodes 54 facilitates connection of electrodes 54 to conductor lines 44. According to one embodiment, the selected portions of layer 140 are removed by etching. In one embodiment, the etchant is configured so as to not remove the material of electrodes 54 while removing portions of layer 140. In other embodiments, portions of layer 140 may be removed by other material removal techniques.

Because electrodes 54 project above and beyond electrodes 56 and because electrodes 54 and 56 are at distinct heights with respect to mandrel 100, a continuous substantially uniform thickness of layer 140 may be removed so as to expose electrodes 54 while electrodes 56 remain covered by layer 140. As a result, photolithography or masking steps may be omitted or reduced in number, reducing fabrication cost and complexity. In other embodiments, photolithography or masking may be used to selectively remove portions of layer 140 opposite to electrodes 54 while maintaining a thickness of layer 140 over electrodes 56. As noted above, in other embodiments where layer 140 is applied so as to not cover the electrodes 54, the material removal steps shown in FIGS. 18 and 19 may be omitted.

Figure 20:
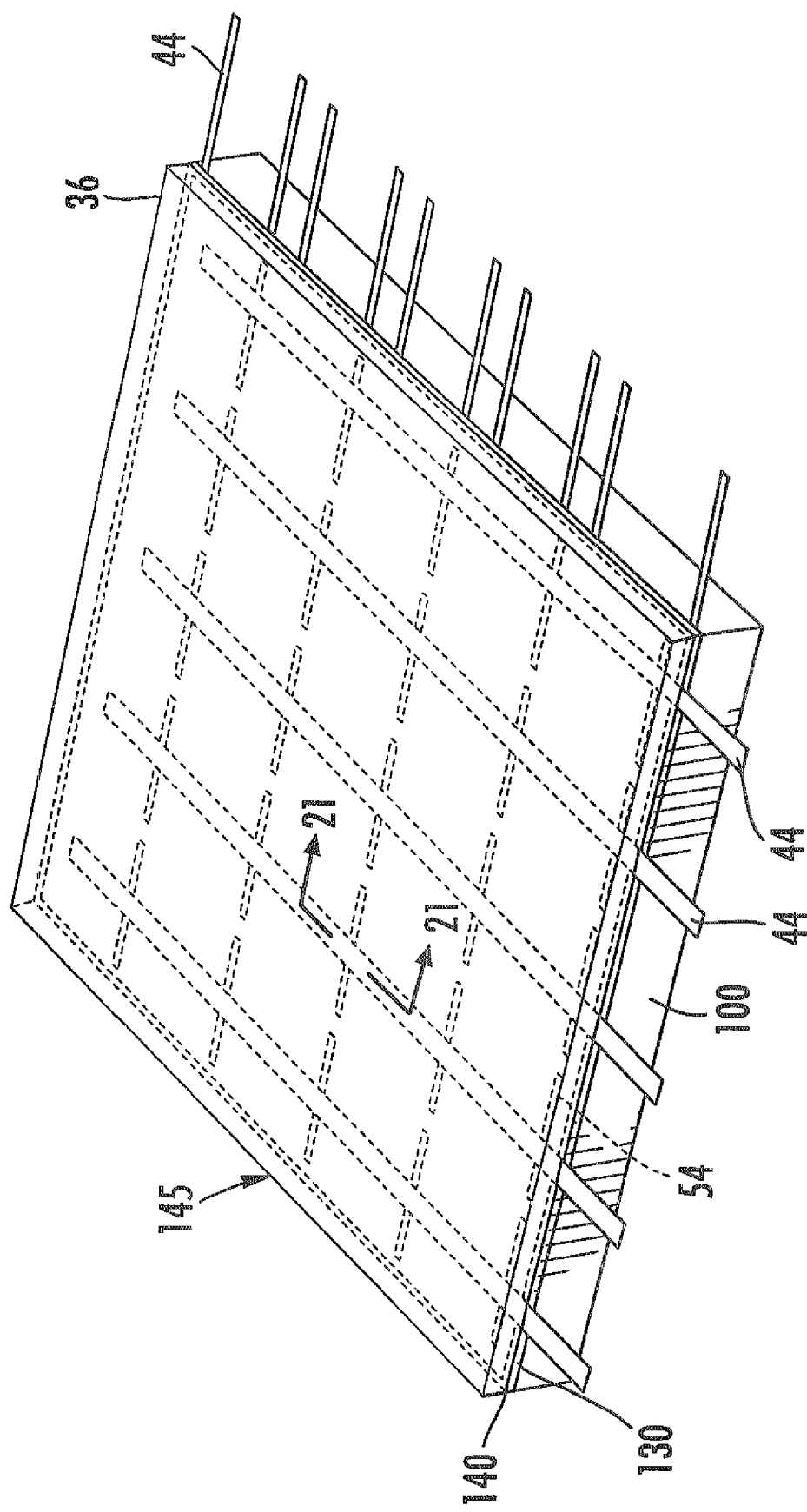
FIG. 20 is a top perspective view of the mandrel of FIG. 18 with a substrate and conductor lines on the second layer according to an example embodiment.
Figure 21:
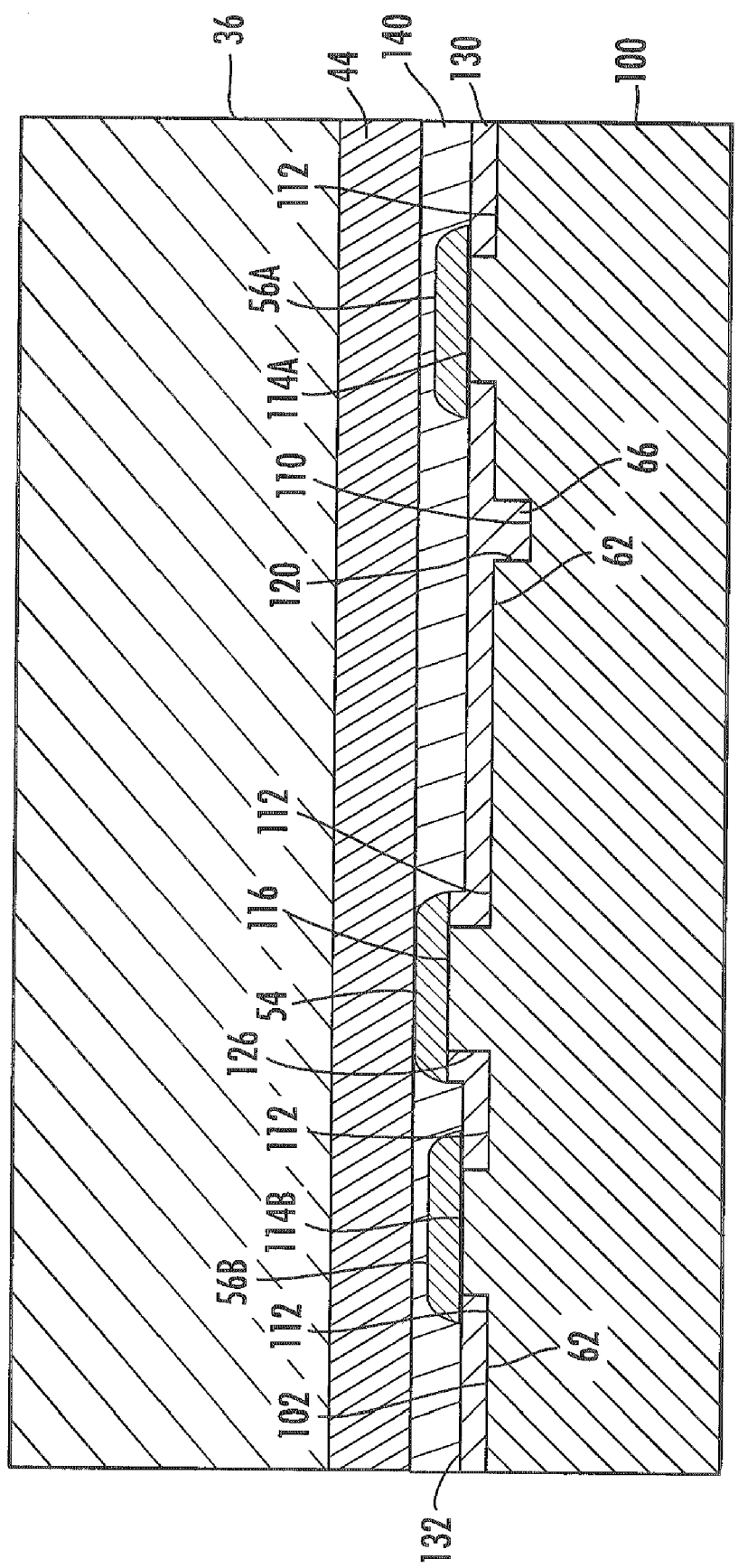
FIG. 21 is a sectional view of the mandrel of FIG. 20 taken along line 21-21 according to an example embodiment.

FIGS. 20 and 21 illustrate the provision of conductor lines 44 and substrate 36. According to one example embodiment, conductor lines 44 are provided upon substrate 36 prior to mounting our connection of substrate 36 to layer 140 to form a separate panel or sheet 145. For example, in one embodiment, conductor lines 44 may be patterned upon substrate 36 using various material deposition techniques. As shown in FIGS. 20 and 21, sheet 145 is laminated to layer 140 with conductor lines 44 extending across and perpendicular to electrodes 54 and electrodes 56 which also partially serve as conductor lines 46. Conductor lines 44 are electrically connected to each electrode 54. In one embodiment, such electrical connections are made by anisotropically conductive adhesive (ACA) bonding or gold/gold bonding. As a result, electrical connection is made to each independent electrode 54.

In other embodiments, conductor lines 44 may be fabricated, deposited, patterned, electroplated or otherwise formed directly on layer 140 perpendicular to and across electrodes 54. Substrate 36 may be subsequently coated, formed, applied, fastened, laminated or bonded over conductor lines 44 and on top of layer 140. In some embodiments, substrate 36 may be omitted.

Upon completion of the structure shown in FIGS. 20 and 21, mandrel 100 is removed and separated from layer 130, resulting in display panel 32 shown in FIG. 1-3. As shown in FIG. 1, electrodes 56 (which serve as conductor lines 46 across panel 32) are electrically connected to controller 34 by conductor lines 46. Likewise, conductor lines 44 are electrically connected to controller 34. As shown by FIG. 2, electrooptical material 52 is placed in each of pixel wells 48.

Although not illustrated, additional steps may be carried out upon display panel 32 shown in FIG. 1-3. For example, in some embodiments, a transparent, opaque or reflective cover may place over pixel wells 48. In some embodiments, additional display panels 32 may be stacked upon the display panel 32 shown in FIG. 1 to form multiple color planes in display, wherein each individual display panel 32 may be configured to provide a different color component (red, green, blue, cyan, magenta, yellow) or different shades (black, white, gray) of a composite image to be presented.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. An apparatus comprising:
 a pixel well having a floor and side walls; and
 first and second electrodes, wherein an entirety of an upwardly facing surface of each of the first and second electrodes in the well is recessed from and below the floor and wherein at least a first portion of the upwardly facing surface of each of the first and second electrodes is exposed along the floor so as to be configured to be exposed to charge responsive optical material in the well.

2. The apparatus of claim 1, wherein the first and second electrodes are at distinct depths below the floor.

3. The apparatus of claim 1 further comprising a grid of first electrical conductor lines below and connected to the first electrode and second electrical lines below and connected to the second electrode.

4. The apparatus of claim 1, wherein the floor and side walls are integrally formed as a single unitary body.

5. The apparatus of claim 1, further comprising the charge responsive optical material in the pixel well.

6. The apparatus of claim 1, wherein the first and second electrodes extend parallel to one another.

7. The apparatus of claim 1 further comprising a third electrode recessed from and below the floor.

8. The apparatus of claim 7, wherein the first electrode is that a first depth, wherein the second electrodes at a second depth different than the first depth and wherein the third electrode is at a third depth equal to the second depth.

9. The apparatus of claim 7 further comprising a grid of third electrical conductor lines below and connected to the third electrode.

10. The apparatus of claim 7 further comprising a controller operably coupled at least two of the first and second electrodes and the third electrode, wherein the third electrode is configured to cooperate with the first electrode to form a first electrical field and wherein the second electrode is configured to cooperate with the first electrode to form a second electrical field different than the first electrical field.

11. The apparatus of claim 10, wherein the first electrical field and the second electrical field have different voltages.

12. The apparatus of claim 10, wherein the first electrical field and the second electrical field have different frequencies.

13. The apparatus of claim 10, wherein the first electrical field and the second electrical field have a same voltage and different frequencies.

14. The apparatus of claim 10, wherein the first electrical field and the second electrical field have different voltages and different frequencies.

15. The apparatus of claim 10 further comprising a charge responsive optical material in the pixel well, wherein the charge responsive optical material is configured to exhibit different characteristics in response to at least one of different voltages or different electrical frequencies.

16. The apparatus of claim 1, wherein the first and second electrodes are recessed from and below the floor by a depth of between about 2 microns and 6 microns.

17. An apparatus comprising:
 a pixel well having a floor; and
 a first electrode within the well, the first electrode being below the floor;
 a second electrode within the well, the second electrode being below the floor; and
 a third electrode within the well, the third electrode being below the floor,
 wherein each of the first electrode, the second electrode and the third electrode are electrically distinct from one another; and
 wherein the first electrode, the second electrode and the third electrode are exposed to a charge responsive optical material along the floor and wherein at least two of the first electrode, the second electrode and the third electrode are at different depths below the floor.

18. An apparatus comprising:
 a charge responsive optical material;

a first electrode contacting the charge responsive optical material along a first plane;

a second electrode contacting the charge responsive optical material along a second plane different than the first plane;

a third electrode contacting the charge responsive optical material along the second plane; and a controller operably coupled at least two of the first and second electrodes and the third electrode, wherein the third electrode is configured to cooperate with the first electrode to form a first electrical field and wherein the second electrode is configured to cooperate with the first electrode to form a second electrical field different than the first electrical field.

19. The apparatus of claim 1, wherein portions of the floor extend over and on top of a second portion of the upwardly facing surface of each of the first and second electrodes.

20. The apparatus of claim 19, wherein the portions of the floor extend over and on top of opposite side edges of the upwardly facing surface of each of the first and second electrodes.

21. The apparatus of claim 17, wherein an entirety of an upwardly facing surface of each of the first electrode and the second electrode within the well is below the floor and wherein at least a first portion of the upwardly facing surface of each of the first electrode and the second electrode is exposed along the floor so as to be exposed to the charge responsive optical material in the well.

22. The apparatus of claim 18, wherein an entirety of an upwardly facing surface of at least one of the first electrode, the second electrode and the third electrode within the well is below the floor and wherein at least a first portion of the upwardly facing surface of at least one of the first electrode, the second electrode in the third electrode is exposed along the floor so as to be configured to be exposed to charge responsive optical material in the well.

23. The apparatus of claim 18, wherein each of the first electrode and the second electrode are configured to be provided with a positive electrical potential with respect to the third electrode.

* * * * *